United States Patent

Bacho et al.

(10) Patent No.: US 6,423,805 B1
(45) Date of Patent: Jul. 23, 2002

(54) POLYMER COMPOSITIONS

(75) Inventors: Anne Margaret Bacho, Delran, NJ (US); Frederick Paul Hinz, Jeffersonville, PA (US); Mark Alan Kesselmayer, Harleysville, PA (US); Kathleen Anne Koziski; Meredith Ann Morgan, both of Lansdale, PA (US); Lori Branham Pfahler, Harleysville, PA (US); Fergus Stuart McColl, Southbank (AU)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/550,658

(22) Filed: Apr. 17, 2000

Related U.S. Application Data

(60) Provisional application No. 60/131,424, filed on Apr. 28, 1999.

(51) Int. Cl.$^7$ .............................................. C08F 118/02
(52) U.S. Cl. ................ 526/319; 526/323.2; 526/329.2; 526/318.4; 526/258; 526/263; 526/264; 524/539; 524/543; 524/556
(58) Field of Search ................ 526/258, 263, 526/264, 304, 318.4, 319, 323.2, 329.2; 524/539, 543, 556

(56) References Cited

U.S. PATENT DOCUMENTS

| | | | | |
|---|---|---|---|---|
| 3,345,203 A | | 10/1967 | Kine et al. | |
| 3,937,680 A | * | 2/1976 | De Carle | 260/29.6 |
| 4,062,831 A | * | 12/1977 | Kopecek et al. | 526/218 |
| 4,145,511 A | * | 3/1979 | Gilles | 528/73 |
| 5,326,644 A | * | 7/1994 | Scholz et al. | 428/514 |
| 5,773,541 A | * | 6/1998 | Boeckh et al. | 526/209 |
| 5,905,114 A | | 5/1999 | Baumstark et al. | 524/801 |

FOREIGN PATENT DOCUMENTS

| | | | |
|---|---|---|---|
| EP | 0 001 166 A1 | | 3/1979 |
| JP | 01005935 A | * | 1/1989 |
| WO | WO 94/21699 | * | 3/1994 |

* cited by examiner

*Primary Examiner*—David W. Wu
*Assistant Examiner*—Tatyana Zalukaeva
(74) *Attorney, Agent, or Firm*—Ronald D. Bakule

(57) ABSTRACT

The open time of a cementitious composition, such as a grout, may be increased by the incorporating therein, as a binder, a polymer composition comprising a film-forming copolymer formed by polymerization of a monomer mixture comprising 1 to 3% of at least one monomer selected from the group of monomers consisting of amides of $\alpha,\beta$-unsaturated $C_3$ to $C_6$ carboxylic acids and at least one hydroxy-($C_1$ to $C_8$)alkyl (meth)acrylate monomer, wherein the total amount of these monomers is from 2 to 7.5% by weight of said monomer mixture.

11 Claims, No Drawings

POLYMER COMPOSITIONS

This application claims the benefit of U.S. provisional application No. 60/131,424, filed Apr. 28, 1999.

This invention is concerned with polymer compositions. More particularly, though not exclusively, the invention is concerned with polymer compositions suitable for use as binders for cementitious grouts.

Ceramic tile adhesives are used extensively for adhering ceramic tiles to substrates, such as the walls, floors and ceilings of bathrooms and kitchens. Once the tiles are adhered to the relevant substrate, a grout is often used to fill the spaces between the tiles and so provide an appropriate finish. Grouts may be either non-cementitious or cementitious and may be purchased as a ready-to-use, formulated one-pack system (non-cementitious) or a two-pack system (cementitious), which comprises a wet part including a polymer, water and defoamer and a dry part including the cementitious component. A variation of the two-pack system involves the use of re-dispersible powder polymer. In this case, the polymer, defoamer and cement comprise the dry component, while the wet component is water only.

Once prepared, a cementitious grout soon begins to cure, typically within 45 minutes of first mixing the cementitious component with the water. It is the curing of the grout which leads to a hard, waterproof seal between the tiles.

The process of applying the grout is a manual process, performed by professionals or DIY enthusiasts. Whether a professional or a DIY enthusiast, such artisans will, at least from time to time, experience the necessity of having to dispose of unused cementitious grout, which grout had gone-off before the artisan had had opportunity to use it. This is particularly so, for example, where the artisan had either left the prepared grout unused for an extended period of time, such as over lunch, or left the grout applied to a substrate for too long before completing the appropriate task, such as in the case of a grout, before it is smoothed to be flush with the tile surface.

The time a grout takes to cure to a point where it is no longer workable is a measure of it's open time. For example, a grout with an open time of 45 minutes may be worked for up to 45 minutes after its preparation before its performance becomes impaired due to it's cure. In other words, the grout may be used for up to 45 minutes after it's preparation before the grout becomes unworkable and must be disposed of.

It is desirable for a grout to have a very long open time, thereby reducing unnecessary waste, but this must be tempered by the requirement for the grout to cure sufficiently quickly for the bathroom or kitchen to be available for use within a short period of time after the tiling has been completed. Typically, the kitchen or bathroom must be usable within 24 hours of completing the tiling. Accordingly, within 24 hours of application, the grout must be sufficiently hard and waterproof.

The curing properties of a cementitious adhesive or grout are primarily controlled by the hydration and crystallisation process between the cement and the water in the mix. However, it is known that the cure rate may be affected by the nature of the polymeric binder employed in the adhesive or grout mix. Binders used in ceramic tile adhesives and grouts are typically based on polymer compositions wherein the polymer is a copolymer formed from a mixture of monomers comprising at least two monomers selected from the group consisting of ($C_1$ to $C_8$) alkyl (meth)acrylates, (meth)acrylic acid, and styrene. Commercially available aqueous polymer compositions, which are formed from a monomer mix as described above and which are promoted for use in ceramic tile adhesives and grouts, include Rhoplex FM-8814K, Rhoplex E-330, Rhoplex-2200, Rhoplex MC-76 and Rhoplex MC-1834 from Rohm and Haas Company, and Acronal S-400 from BASF AG. Cementitious grouts formulated with these binders tend to have an open time in the order of 40 to 50 minutes and are sufficiently cured after 24 hours from application.

To obtain economies of scale, manufacturers prefer to produce polymers which they may sell for use in several applications and formulators prefer to purchase polymers which they can formulate into several different products. For example, it is preferred if a new polymer primarily produced for use in a cementitious grout can also be used in or as a binder in a cementitious or non-cementitious ceramic tile adhesive, a coating, such as a cementitious or non-cementitious paint, or a mastic. In this way, the potential market for the new polymer is significantly enhanced. However, this is only true if the properties of the end product are not detrimentally affected by substituting or replacing an old polymer with the new polymer. In the most preferred situation, the new polymer will not only equal the performance of the old polymer, but will also somehow improve on that performance.

EP-A-0810274 discloses binders useful in low-emission coatings, such as plasters, tile grouts and paints, especially low-emission dispersion paints, and offer improved wet abrasion resistance. The binders comprise at least one aqueous polymer dispersion having a minimum film forming temperature less than 10° C. and prepared by free-radical aqueous emulsion polymerisation of a monomer mixture comprising a) 45 to 70 parts by weight of at least one monomer whose homopolymer has a Tg (glass transition temperature) less than 20° C., b) 30–55 parts by weight of at least one monomer whose homopolymer has a Tg greater than 50° C., c) 0 to 1 part by weight of at least one monomer with acidic groups, and d) 0 to 2 parts by weight of at least one extra monomer chosen from amides of alpha, beta-unsaturated $C_3$–$C_6$ carboxylic acids, their hydroxy-($C_2$–$C_6$) alkyl-esters and/or N-vinyl lactams, with the proviso that the total of the weight parts a) plus b) amounts to 100 parts by weight.

It is the object of the present invention to provide polymer compositions which are suitable for use in or as binders in cementitious grouts and which, once formulated into said grouts, are capable of contributing to an increased open time without affecting detrimentally any other properties expected from a grout. Preferably, the polymer compositions can be used in other fields of application.

In accordance with the present invention, there is provided a polymer composition comprising a film-forming copolymer, preferably having a Tg of from −40° C. to +30° C., formed by polymerisation of a monomer mixture comprising:

a) at least one monomer selected from the group of monomers consisting of ($C_1$ to $C_{18}$) alkyl (meth)acrylates, styrene, substituted styrene, acrylonitrile, butadiene, isoprene, isobutylene, ethylene, propylene vinyl acetate and other vinyl esters of ($C_1$–$C_{12}$) carboxylic acids such as VV-9 and VV-10 from Shell Chemical Company and Vinate 2-EH from Union Carbide.

b) 1 to 3% by weight of said mixture of at least one monomer selected from the group of monomers consisting of amides of α,β-unsaturated $C_3$ to $C_6$ carboxylic acids and N-vinyl lactams, c) at least 1% by weight of said mixture of at least one hydroxy-($C_1$ to $C_8$)alkyl (meth)acrylate, wherein the total quantity of b) and c) constitutes from 2 to 7.5%, preferably 2 to 6%, more preferably 2 to 5%, by weight of said monomer mixture, and d) 0 or up to 1% by weight of said monomer mixture of at least one polymerizable compound comprising functional-acid groups.

In another aspect of the present invention, there is provided a method for increasing the open time of a cementitious composition comprising an aqueous polymer composition comprising a film-forming copolymer, preferably having a Tg of from −40° C. to +30° C., formed by polymerisation of a monomer mixture comprising:

a) at least one monomer selected from the group of monomers consisting of ($C_1$ to $C_{18}$) alkyl (meth)acrylates, ($C_5$ to $C_{10}$) cyclo-alkyl (meth)acrylates, styrene, substituted styrene, acrylonitrile, butadiene, isoprene, isobutylene, ethylene, propylene, vinyl acetate and other vinyl esters of ($C_1$–$C_{12}$) carboxylic acids such as VV-9 and VV-10 from Shell Chemical Company and Vinate 2-EH from Union Carbide, b) 0 or up to 1% by weight of said monomer mixture of at least one polymerizable compound comprising functional-acid groups, which method comprises incorporating into said monomer mixture prior to it's polymerisation:

c) 1 to 3% by weight of said mixture of at least one monomer selected from the group of monomers consisting of amides of α,β-unsaturated $C_3$ to $C_6$ carboxylic acids and N-vinyl lactams; and d) at least 1% by weight of said mixture of at least one hydroxy-($C_1$ to $C_8$)alkyl (meth)acrylate, wherein the total quantity of c) and d) constitutes from 2 to 7.5%, preferably 2 to 6%, more preferably 2 to 5%, by weight of said monomer mixture.

In yet another aspect of the present invention, there is provided the use to increase the open time of a formulated aqueous cementitious composition of a polymer composition comprising a film-forming copolymer, preferably having a Tg of from −40° C. to +30° C., formed by polymerisation of a monomer mixture comprising:

a) at least one monomer selected from the group of monomers consisting of ($C_1$ to $C_{18}$) alkyl (meth)acrylates, ($C_5$ to $C_{10}$) cyclo-alkyl (meth)acrylates, styrene, substituted styrene, acrylonitrile, butadiene, isoprene, isobutylene, ethylene, propylene, vinyl acetate and other vinyl esters of ($C_1$–$C_{12}$) carboxylic acids such as VV-9 and VV-10 from Shell Chemical Company and Vinate 2-EH from Union Carbide, b) 1 to 3% by weight of said mixture of at least one monomer selected from the group of monomers consisting of amides of α,β-unsaturated $C_3$ to $C_6$ carboxylic acids and N-vinyl lactams, and;

c) at least 1% by weight of said mixture of at least one hydroxy-($C_1$ to $C_8$)alkyl (meth)acrylate wherein the total quantity of b) and c) constitutes from 2 to 7.5%, preferably 2 to 6%, more preferably 2 to 5%, by weight of said monomer mixture, and d) 0 or up to 1% by weight of said monomer mixture of at least one polymerizable compound comprising acid groups.

Surprisingly, it has been found that a formulated aqueous cementitious composition comprising the polymer compositions of the present invention, such as a grout, may have an increased open time in comparison to conventional formulated compositions and that this may be achieved without any significant detrimental effect upon the other material properties of the formulated composition.

The film-forming copolymer is formed by polymerisation of a monomer mixture, comprising at least one monomer selected from the group of monomers consisting of ($C_1$ to $C_{18}$) alkyl (meth)acrylates, preferably ($C_4$ to $C_{18}$)alkyl (meth)acrylates, ($C_5$ to $C_{10}$) cyclo-alkyl (meth)acrylates, styrene, substituted styrenes preferably halogenated or non-halogenated ($C_1$–$C_4$)alkyl-substituted styrenes, acrylonitrile, butadiene, isoprene, isobutylene, ethylene, propylene and vinyl acetate and other vinyl esters of ($C_1$–$C_{12}$) carboxylic acids such as VV-9 and VV-10 from Shell Chemical Company and Vinate 2-EH from Union Carbide. Preferably, said group of monomers consists of, butyl acrylate, n-octyl acrylate, 2-ethyl hexyl acrylate, n-decyl acrylate, lauryl acrylate, stearyl acrylate, iso-bornyl acrylate, methyl methacrylate, ethyl methacrylate, butyl methacrylate, isobutyl methacrylate, 2-ethyl hexyl methacrylate, n-decyl methacrylate, lauryl methacrylate, stearyl methacrylate, iso-bornyl methacrylate, dibutyl maleate, monobutyl maleate, phosphoethyl methacrylate, sulphoethyl methacrylate, styrene, ($C_1$–$C_4$)alkyl-substituted styrenes, acrylonitrile, methacrylonitrile, vinyl acetate and other vinyl esters of ($C_1$–$C_{12}$) carboxylic acids such as VV-9 and VV-10 from Shell Chemical Company and Vinate 2-EH from Union Carbide, butadiene, isoprene, ethylene and propylene. More preferably, said group of monomers consists of, butyl acrylate, 2-ethylhexyl acrylate, lauryl acrylate, stearyl acrylate, iso-bornyl acrylate, methyl methacrylate, ethyl methacrylate, butyl methacrylate, isobutyl methacrylate, 2-ethylhexyl methacrylate, lauryl methacrylate, stearyl methacrylate, iso-bornyl methacrylate, styrene, vinyltoluene, alpha-methyl styrene, acrylonitrile, and methacrylonitrile. Most preferably said group of monomers consists of butyl acrylate, 2-ethylhexyl acrylate, methyl methacrylate, styrene and acrylonitrile. The above monomers must be present in said monomer mixture preferably in an amount of up to 98%, more preferably 50 to 98%, and yet more preferably 70 to 98%, by weight of said mixture. Most preferably, acrylonitrile is present in said monomer mixture in an amount of up to 5%, preferably 0 to 3.5%, by weight of said mixture.

The film-forming copolymer is formed by polymerisation of a monomer mixture comprising 1 to 3%, by weight of said mixture of at least one monomer selected from the group of monomers consisting of amides of α,β-unsaturated $C_3$ to $C_6$ carboxylic acids and N-vinyl lactams. Preferably, said group of monomers consists of amides of α,β-unsaturated $C_3$ to $C_6$ carboxylic acids and N-vinyl pyrrolidone, more preferably (meth)acrylamide, N-methylol (meth)acrylamide, and N-vinyl pyrrolidone. Acrylamide is the most preferred monomer.

Preferably, the film-forming copolymer is formed by polymerisation of a monomer mixture comprising at least 1%, preferably from 1 to 4%, more preferably 1 to 3%, by weight of said mixture of at least one hydroxy-($C_1$ to $C_5$)alkyl (meth)acrylate. More preferably, said group of monomers consists of 2-hydroxyethyl (meth)acrylate and 2-hydroxypropyl (meth)acrylate. The most preferred monomer is 2-hydroxyethyl methacrylate.

Preferably, the film-forming copolymer is formed by polymerisation of a monomer mixture comprising from 0 or up to 1%, preferably 0.05 to 0.75%, more preferably 0.1 to 0.5%, by weight of said mixture of at least one polymerizable compound comprising acid groups. Preferably said compound comprises at least one ethylenically unsaturated group and at least one acid group. More preferably, said compound is at least monomer is selected from the group of monomers consisting of α,β-unsaturated $C_3$ to $C_6$ carboxylic acids, α,β-unsaturated $C_4$ to $C_8$ dicarboxylic acids, anhydrides of α, β-unsaturated $C_3$ to $C_6$ carboxylic acids and α,β-unsaturated $C_4$ to $C_8$ dicarboxylic acids, and monoethylenically unsaturated ($C_2$ to $C_8$)alkyl- or aryl-sulphonic acids. Preferably said group of monomers consists of acrylic acid, methacrylic acid, itaconic acid, maleic acid, fumaric acid, crotonic acid, methacrylic anhydride, maleic anhydride, itaconic anhydride, vinyl sulphonic acid, methallyl sulphonic acid, vinylbenzene sulphonic acid, styrene sulphonic acid, acrylamidoethane sulphonic acid acrylamido-2-methylpropansulphonic acid, 2-sulfoethyl (meth)acrylate and 2-sulfopropyl (meth)acrylate. Acrylic acid and methacrylic acid are the most preferred monomers.

In addition to monomers a), b), c) and d), as defined above, the monomer mixture which is polymerized to produce the film forming copolymer may comprise other polymerizable monomers, (e). These additional monomers may, once polymerized, contribute functionality to promote crosslinking, adhesion, water-resistance, dirt pick-up resistance, or higher strength of the film. Examples of monomers which may contribute towards functionality include polymerizable siloxane-group containing monomers, such as vinyl trialkoxysilane, e.g., vinyl trimethoxysilane or vinyl triethoxysilane, alkylvinyl dialkoxysilanes, (meth)acryloxyalkyl trialkoxysilanes, e.g., (meth)acryloxypropyl trimethoxysilane, vinyl trichlorosilane, (meth)acryloxyethyl methyldialkoxysilanes, (meth)acryloxypropyl methyldialkoxysilanes and vinyl tris (beta-methoxyethoxy) silane, and/or acetoacetoxy-($C_1$–$C_4$) alkyl-(meth)acrylates, such as acetoacetoxyethylmethacrylate. The monomers which may contribute functionality (monomer (e)) may be present in the monomer mixture in a total amount of from 0.05 to 20%, preferably 0.05 to 10%, more preferably 0.01 to 5%, by weight of said monomer mixture. The monomers which contribute no functionality may be present in a total amount of up to 20%, preferably up to 10%, by weight of said monomer mixture.

The polymer composition of the present invention may be an aqueous dispersion or solution of the copolymer described above. Preferably, the composition is an aqueous dispersion of copolymer particles, which dispersion is preferably formed by emulsion polymerisation of the relevant monomers. Alternatively, the polymer composition may be in the form of a dry powder.

In one embodiment, the film-forming copolymer may be a polymer formed by aqueous emulsion polymerisation of a monomer mix consisting of 68.3% butyl acrylate, 25.9% styrene, 1.5% acrylamide, 2% hydroxyethyl methacrylate, 2% acrylonitrile and 0.3% methacrylic acid. In another embodiment, the film-forming copolymer may be a polymer formed by aqueous emulsion polymerisation of a monomer mix consisting of 74.1% butyl acrylate, 20.1% isobornyl methacrylate, 1.5% acrylamide, 2% hydroxyethyl methacrylate, 2% acrylonitrile and 0.3% methacrylic acid. In yet another embodiment, the film-forming copolymer may be a polymer formed by aqueous emulsion polymerisation of 68.3% butyl acrylate, 25.9% ethyl acrylate, 1.5% acrylamide, 2% hydroxyethyl methacrylate, 2% acrylonitrile and 0.3% acrylic acid.

The polymer compositions are useful in or as binders for cementitious ceramic tile adhesives and grouts. They may also be useful in or as binders for other formulated compositions, which other formulations may or may not comprise a cementitious component. Such other formulated compositions include coatings, such as interior and exterior topcoats, basecoats and primers, other adhesives, such as construction adhesives, pressure sensitive adhesives and wood glues, mastics, caulks, sealants, concrete patching mortars, self-leveling mortars, waterproofing membranes, exterior insulation and finish systems (EIFS), and slurries and coatings for rooftiles, and as binders for textiles, nonwovens and paper.

In addition to demonstrating increased open time in cementitious formulated compositions, the polymer compositions of the present invention may also demonstrate improved adhesion properties in certain formulated compositions. For example, ceramic tile adhesives comprising the aqueous polymer composition of the present invention may demonstrate improved adhesion on concrete, ceramic or wooden substrates, and mastics comprising the polymer composition of the present invention may demonstrate improved adhesion on concrete and metal substrates.

Depending upon the particular application of the formulated compositions which comprise the polymer compositions of the present invention, the copolymer preferably has a Tg in the range of from about −50° C. to +30° C., more preferably −40 to +30° C. When the formulated composition is cementitious, the copolymer preferably has a Tg in the range of −50 to +25° C. In the case where the formulated composition is a ceramic tile adhesive, grout, waterproofing membrane, mastic, caulk or sealant, the copolymer preferably has a Tg in the range of from about −30° C. to 10° C. When the formulated composition is a pressure sensitive adhesive, the copolymer preferably has a Tg in the range −50 to +20° C. When the formulated composition is a paint or primer, the copolymer preferably has a Tg in the range from about −10° C. to +30° C. When the polymer composition is a binder for paper applications the film forming copolymer will typically have a Tg in the range of 0 to +25° C., and when it is a binder for textile and non-woven applications the film forming copolymer will typically have a Tg in the range of −40 to +20° C. For EIFS applications, the film forming copolymer will typically have a Tg in the range −20 to +15° C. The Tg is determined by differential scanning calorimetry (DSC), measured at a rate of heating of 3° C. per minute, with the Tg taken at the midpoint of the transition.

The present invention shall now be more specifically described in terms of the following examples of some preferred embodiments which are given for the purposes of illustration only, and may be contrasted with the comparative tests also given below.

In the following examples, reference shall be made to the following test procedures:

Open Time: The open time is used as a measure of compatibility between cement and the emulsion polymer modifier. The objective is to assure the modified mortar possesses enough cement compatibility to allow its use in a convenient time frame. Generally speaking, longer open times are preferred up to the point where they extend to such an extent that they effect the set time. The test is run by preparing a polymer modified grout. The grout is manually mixed and checked for workability every 5 minutes until 30 minutes and then every 10 minutes until 2 hours of elapsed time. After 2 hours the workability is checked every 15 minutes.

24 Hour Compression: The purpose of the 24 hour compressive strength measurement is to indicate early strength development or in other words, the degree of retardation of setting. The procedure involves the preparation of three 5 cm (2-inch) replicate cubes of modified mortar using the procedure described in ASTM C-109 (American Society for Testing and Materials). The test specimens are de-molded immediately before testing on a Tinius Olsen testing apparatus capable of delivering 45,360 Kg (100,000 pounds) of force.

7 day quarry-to-plywood: The purpose of this evaluation is the measurement of the adhesive strength of a ceramic tile adhesive mortar between a low porosity quarry tile and plywood, a difficult to adhere to substrate. The procedure used for this test is described in ANSI 118.4 (American National Standard Institute) for quarry tile. The load rate used was 1089 Kg (2400 pounds)/minute on the Tinius Olsen testing apparatus.

7 day dry wall tile adhesion: The 7 day adhesion strength of a highly modified ceramic tile adhesive mortar shows the performance on a high porosity substrate, glazed ceramic wall tile. The procedure used for this test is described in ANSI 118.4 for wall tile. The cross-head separation rate was 2.54 cm/minute on the Tinius Olsen testing apparatus.

7 day dry/7 day wet wall tile adhesion: The purpose of this test is to measure the retention of adhesion strength under wet conditions and is conducted using the protocol described for the 7 day dry test. After the tile assemblies are cured for 7 days under dry conditions, they are submerged in water for an additional 7 days.

Elongation Break and Tensile Max/Break: In addition to testing the properties of cementitious formulations, the purpose of this test is to measure the mechanical properties of a non-cementitious waterproof membrane. The mechanical properties of the membrane were evaluated using a Tinius Olson tensile tester. A dogboned shape piece of film, (ASTM D412 type C), was cut out, whose center part was 2.54 cm long and 6.35 cm wide. This was stretched at the rate of 5.08 cm per minute, and the stress/strain curve recorded. In general, stronger and higher elongating films are desired, and the compositions of examples 18–22 indeed have comparable to higher maximum strength and greater elongation at break. In the Table, values are quoted in MPa., except for elongation which is in units of percent.

EXAMPLE 1

An aqueous polymer composition comprising a copolymer of the composition 67.7 BA/30.8 St/1.5 AM (BA=butyl acrylate; St=styrene; AM=acrylamide) was prepared according to the following procedure. A stirred reactor containing 490 grams of de-ionized water was heated to 87° C. To this was added 65 grams of a 45% solids content, polymer preform emulsion with a 100 nm particle size and 6.71 grams of sodium persulfate. Over the next four hours, a monomer emulsion made up of 230.0 grams of de-ionized water, 21.2 grams of a 23% solution of sodium dodecylbenzene sulfonic acid, 602.4 grams of styrene, 1324.1 grams of butyl acrylate and 29.35 grams of acrylamide, was added, while maintaining a kettle reaction temperature of 86° C. A solution of 2.88 grams of sodium persulfate in 250 grams water was simultaneously added to the reactor. After 60% of the monomer emulsion had been added, 95.4 grams of a 41% solid content, polymer preform emulsion with a 60 nm particle size was added to the reactor. After the monomer emulsion addition was complete, the remaining traces of monomer were polymerized by reducing the kettle temperature to 75° C. and adding to the reactor an aqueous solution of 0.01 grams of ferrous sulfate heptahydrate in 5 grams water, 1.51 grams of t-butyl hydroperoxide in 4 grams water and 1.29 grams of sodium sulfoxylate formaldehyde in 28 grams water. After holding the reactor for a period of time, 6.1 grams of t-butyl hydroperoxide in 16 grams of water was added to the reactor, followed by the addition of 5.18 grams of sodium sulfoxylate formaldehyde in 112 grams of water. The reactor was then cooled to 50° C. and 20.95 grams of a 70% solution of an alkyl alcohol ethoxylate with 40 ethylene oxide units in 50 grams of water was added to the reactor followed by 6 grams of a 50% solution of sodium hydroxide in 50 grams of water. Kathon LX (Rohm and Haas biocide) was added followed by dilution with water to give a 56.0% solids content emulsion, with a pH of 8.5, a viscosity of 132 centipoise and a Tg of −7° C.

EXAMPLES 2 TO 9

By substantially the same procedure as for Example 1 described above, aqueous polymer compositions 2 to 9 were prepared comprising copolymers of the following compositions:

EXAMPLE 2

67.8 BA/30.4 St/1.5 AM/0.3 MAA (MAA=methacrylic acid) Please note this corresponds to Example 2 of EP-A-0810274. The resulting emulsion had a solid content of 56.0%, a pH of 7.4 and a Tg of −5° C.

EXAMPLE 3

67.6 BA/30.4 St/1.5 AM/0.5 HEMA (HEMA=hydroxyethyl methacrylate). The resulting emulsion had a solid content of 56.2%, a pH of 8.8 and a Tg of −5° C.

EXAMPLE 4

67.7 BA/30 St/1.5 AM/0.5 HEMA/0.3 MAA. The resulting emulsion had a solid content of 56.2%, a pH of 7.5 and a Tg of −7° C.

EXAMPLE 5

67.2 BA/29.3 St/1.5 AM/2 HEMA. The resulting emulsion had a solid content of 56.3%, a pH of 8.0 and a Tg of −5° C.

EXAMPLE 6

67.4 BA/28.8 St/1.5 AM/2 HEMA/0.3 MAA. The resulting emulsion had a solid content of 56.2%, a pH of 7.5 and a Tg of −4° C.

EXAMPLE 7

68.1 BA/26.4 St/1.5 AM/2 HEMA/2.0 AN (AN=acrylonitrile). The resulting emulsion had a solid content of 56.1%, a pH of 8.9 and a Tg of −8° C.

EXAMPLE 8

68.3 BA/25.9 St/1.5 AM/2 HEMA/2 AN/0.3 MAA. The resulting emulsion had a solid content of 56.1%, a pH of 7.5 and a Tg of −7° C.

EXAMPLE 9

68.3 BA/25.9 St/1.5 AM/2 HEMA/2 AN/0.3 AA (AA=acrylic acid). The resulting emulsion had a solid content of 55.9%, a pH of 6.6 and a Tg of −5° C.

EXAMPLE 10

The polymerization was carried out as in Example 1, except the monomer emulsion consisted of 1294.74 grams of butyl acrylate, 586.74 grams of styrene, 39.12 grams of hydroxyethyl acrylate, 29.34 grams of acrylamide and 5.87 grams of methacrylic acid and the amount of sodium persulfate used was 8.49 grams in the initial reactor charge and 3.64 grams in the cofeed. Additionally, the polymerization was carried out at 84° C. The resulting emulsion had a solid content of 50%, a pH of 6.6 and a Tg of −4° C.

EXAMPLE 11

The polymerization was carried out as in Example 10, except the monomer composition is 36.2 BA/30.0 LMA/30 St/2 HEMA/1.5 AM/0.3 MAA (LMA=lauryl methacrylate) and 9.8 grams of methyl-beta-cyclodextrin is added in the initial reactor charge with the de-ionized water. The resulting emulsion had a solid content of 57.1%, a pH of 6.4 and a Tg of −8° C.

EXAMPLE 12

The polymerization was carried out as in Example 10, except the monomer composition is 66 BA/30 St/2 HEMA/1.5 AM/0.5 Oligomeric-AA. The terminally unsaturated oligomeric AA species used had a weight average molecular weight (Mw) of 1199 and a number average molecular weight (Mn) of 485. The resulting emulsion had a solid content of 56.0%, a pH of 4.9 and a Tg of −3° C.

EXAMPLE 13

An aqueous polymer composition comprising a copolymer of the composition 67.2 BA/14.3 St/15 MMA/1 AM/2 HEMA/0.5 MAA (MMA=methyl methacrylate) was prepared according to the following procedure. A stirred reactor containing 600 grams of de-ionized water was heated to 85° C. To this was added 7.00 grams of sodium persulfate and 65.5 grams of a 45% solids content, polymer preform emulsion with a 100 nm particle size. Over the next four hours, a monomer emulsion made up of 200.00 grams of de-ionized water, 21.3 grams of a 23% solution of sodium dodecylbenzene sulfonic acid, 279.6 grams of styrene, 1314.3 grams of butyl acrylate, 293.4 grams of methyl methacrylate, 19.55 grams of acrylamide, 39.1 grams of HEMA and 9.8 grams of methacrylic acid was added over 4 hours, while maintaining a kettle reaction temperature of 84° C. A solution of 2.3 grams of sodium persulfate in 120 grams water was simultaneously added to the reactor. After 60% of the monomer emulsion had been added, 93 grams of a 41% solid content, polymer preform emulsion with a 60 nm particle size was added to the reactor. After the monomer emulsion addition was complete, the remaining traces of monomer were polymerized by reducing the kettle temperature to 75° C. and adding to the reactor an aqueous solution of 0.02 grams of ferrous sulfate heptahydrate in 15 grams of water and 11.2 grams of t-butyl hydroperoxide in 20 grams of water. Sodium sulfoxylate formaldehyde (5.8 grams dissolved in 150 grams of water) was then added. The reactor was then cooled to 50° C. and 28 grams of a 70% solution of an alkyl alcohol ethoxylate with 40 ethylene oxide units in 50 grams of water was added to the reactor followed by 6 grams of a 50% solution of sodium hydroxide in 50 grams of water. Dilution with water to gave a 58.6% solids content emulsion, with a pH of 7.0, a viscosity of 246 centipoise and a Tg of −10° C.

EXAMPLES 14–22

Depending upon the test to be performed, each of the polymer compositions prepared in Examples 1 to 9 were formulated into the formulations described below:

Open Time (Grouting mortar formulation)
Dry Component

| | |
|---|---|
| 200 g | 60 mesh sand (local sand) |
| 100 g | Portland Cement Type I (gray) |

Liquid Component

| | |
|---|---|
| 20 g | Emulsion polymer (dry weight basis) |
| 43 g | Water |
| 0.2 g | Nopco NXZ defoamer available from Henkel Corp |

24 Hour Compressive Strength (Patching mortar formulation)
Dry Component

| | |
|---|---|
| 750 g | ASTM C-109 Sand |
| 300 g | Portland Cement Type I (gray) |

Liquid Component

| | |
|---|---|
| 30 g | Emulsion Polymer (dry weight basis) |
| 145.5 g | Water |
| 0.3 g | Nopco NXZ defoamer |

7 Day Quarry-to-Plywood (Ceramic Tile Adhesive Mortar)
Dry Component

| | |
|---|---|
| 180 g | 60 mesh sand |
| 120 g | Portland Cement Type I (gray) |
| 1.2 g | Cellulosic Thickener |

Liquid Component

| | |
|---|---|
| 24 g | Emulsion Polymer (dry basis) |
| 60 g | Water |
| 0.24 g | Nopco NXZ |

7 Day dry and 7 Day Dry/7 Day Wet (Ceramic Tile Adhesive)
Dry Component

| | |
|---|---|
| 180 g | 60 mesh sand |
| 120 g | Portland Cement Type I (gray) |
| 1.2 g | Cellulosic Thickener |

Liquid Component

| | |
|---|---|
| 60 g | Emulsion Polymer (dry basis) |
| 60 g | Water |
| 0.35 g | Nopco NXZ |

Elongation Break and Tensile Max/Break (Waterproofing Membranes)

Grind 30.6 g water 2.8 g Nopco NXZ 5.8 g Tamol 731 available from Rohm and Haas Co.

13.6 g TiONA RCL 575 available from Millennium Inorganic Chemicals 111.2 g Omyacarb 10 available from Omya (California), Inc.

41.2 g Omyacarb 2 available from Omya (California), Inc.

After mixing the grind at high speed on a Cowles dissolver, the grind was let down with 200 grams of 56% solids emulsion, 1.2 grams of Acrysol SCT 275 available from Rohm and Haas Co., and 2 grams of Nopco NXZ.

The formulations prepared in Examples 14 to 22 were then tested in accordance with the respective test procedures described above. In addition, as a comparative, a commercially available binder, Acronal S-400, sold by BASF AG for use in ceramic tile adhesives and grouts was formulated as above and tested. The results of these tests are shown in Table 1.

It can be seen from Table 1 that the cementitious grout formulations in Example 18 to 22, each of which comprises the polymer compositions of the present invention Example 5 to 9, demonstrate a significantly improved open time when compared to the cementitious grout formulations based on the comparative and the other copolymers of Examples 1 to 4. This is achieved without significantly affecting the other properties expected of the cementitious grout. Further, it is shown in Table 1 that other cementitious and non-cementitious formulations based on the polymer compositions of the present invention demonstrate a good balance of performance characteristics enabling a broad application base for said polymers.

TABLE 1

|  | Comparative | Example 14 | Example 15 | Example 16 | Example 17 | Example 18 | Example 19 | Example 20 | Example 21 | Example 22 |
|---|---|---|---|---|---|---|---|---|---|---|
| Cementitious Formulations |  |  |  |  |  |  |  |  |  |  |
| 24 Hour Compression (MPa) | 5.83 | 4.44 | 6.08 | 5.41 | 5.83 | 5.33 | 5.19 | 4.91 | 5.47 | 5.30 |
| ANSI 7 day dry (MPa) | 1.62 | 1.84 | 2.01 | 1.90 | 1.77 | 1.94 | 2.04 | 2.00 | 2.11 | 2.11 |
| ANSI 7 day dry/wet (MPa) | 1.32 | 1.34 | 1.41 | 1.44 | 1.49 | 1.47 | 1.60 | 1.59 | 1.50 | 1.35 |
| 7 day quarry/ply (MPa) | 1.03 | 1.17 | 1.63 | 1.39 | 1.60 | 1.52 | 1.70 | 1.57 | 1.79 | 1.67 |
| Open Time (min.) | 38 | 49 | 5 | 47 | 5 | 86 | 98 | 84 | 78 | 77 |
| Non-Cementitious Formulations |  |  |  |  |  |  |  |  |  |  |
| Elongation @ Break (%) | 572 | 841 | 919 | 821 | 842 | 875 | 870 | 886 | 943 | 1036 |
| Maximum Tensile (MPa) | 0.72 | 0.65 | 0.78 | 0.63 | 0.75 | 0.68 | 0.78 | 0.72 | 0.80 | 0.81 |
| Tensile @ Break (MPa) | 0.36 | 0.29 | 0.33 | 0.27 | 0.33 | 0.26 | 0.36 | 0.34 | 0.43 | 0.45 |

We claim:

1. A polymer composition comprising a film-forming a copolymer formed by polymerization of a monomer mixture comprising:
   a) at least one monomer selected from the group of monomers consisting of ($C_1$ to $C_{18}$) alkyl (meth)acrylates, ($C_5$ to $C_{10}$) cyclo-alkyl (meth)acrylates, styrene, substituted styrene, acrylonitrile, butadiene, isoprene, isobutylene, ethylene, propylene, and vinyl acetate and other vinyl esters of ($C_1$–$C_{12}$) carboxylic acids,
   b) 1 to 3% by weight of said monomer mixture of acrylamide,
   c) at least 1% by weight of said monomer mixture of at least one hydroxy-($C_1$ to $C_8$)alkyl (meth)acrylate, wherein the total quantity of b) and c) constitutes from 2 to 7.5% by weight of said monomer mixture, and
   d) 0 or up to 1% by weight of said monomer mixture of at least one polymerizable compound comprising acid groups,
wherein said monomer mixture includes no N-vinyl pyrrolidone.

2. The composition of claim 1, wherein said component a) is 50 to 98% by weight of said monomer mixture of at least one monomer selected from the group of monomers consisting of butyl acrylate, 2-ethylhexyl acrylate, methyl methacrylate, and styrene.

3. The composition of claim 1, wherein said component b) is 1 to 1.5% by weight of said monomer mixture of acrylamide.

4. The composition of claim 1, wherein said component c) is 1 to 3% by weight of said monomer mixture of at least one monomer selected from the group consisting of 2-hydroxyethyl (meth)acrylate and 2-hydroxypropyl (meth)acrylate.

5. The composition of claim 1, wherein said component d) is 0.1 to 0.5% by weight of said monomer mixture of at least one monomer selected from the group consisting of acrylic acid and methacrylic acid.

6. A polymer composition comprising a film-forming copolymer formed by polymerization of a monomer mixture consisting essentially of:
   a) at least one monomer selected from the group of monomers consisting of ($C_1$ to $C_{18}$) alkyl (meth)acrylates, ($C_5$ to $C_{10}$) cyclo-alkyl (meth)acrylates, styrene, substituted styrene, acrylonitrile, butadiene, isoprene, isobutylene, ethylene, propylene, and vinyl acetate and other vinyl esters of ($C_1$–$C_{12}$) carboxylic acids,
   b) 1 to 3% by weight of said mixture of at least one monomer selected from the group of monomers consisting of amides of α,β-unsaturated $C_3$ to $C_6$ carboxylic acids,
   c) at least 1% by weight of said mixture of at least one hydroxy-($C_1$ to $C_8$)alkyl (meth)acrylate, wherein the total quantity of b) and c) constitutes from 2 to 7.5% by weight of said monomer mixture, and
   d) 0 or up to 1% by weight of said monomer mixture of at least one polymerizable compound comprising acid groups,
wherein said monomer mixture is polymerized by aqueous emulsion polymerization.

7. The composition of claim 6, wherein said component a) is 50 to 98% by weight of said monomer mixture of at least one monomer selected from the group of monomers consisting of butyl acrylate, 2-ethylhexyl acrylate, methyl methacrylate, and styrene.

8. The composition of claim 6, wherein said component b) is 1 to 3% by weight of said monomer mixture of at least one monomer selected from the group consisting of (meth)acrylamide, and N-methylol (meth)acrylamide.

9. The composition of claim 6, wherein said component c) 1 to 3% by weight of said monomer mixture of at least one monomer selected from the group consisting of 2-hydroxyethyl (meth)acrylate and 2-hydroxypropyl (meth)acrylate.

10. The composition of claim 10, wherein said component d) is 0.1 to 0.5% by weight of said monomer mixture of at lease one monomer selected from the group consisting of acrylic acid and methacrylic acid.

11. A method for increasing the open time of an aqueous cementitious composition comprising a polymer composition comprising a film-forming copolymer formed by polymerisation of a monomer mixture comprising:

a) at least one monomer selected from the group of monomers consisting of ($C_1$ to $C_{18}$) alkyl (meth)acrylates, ($C_5$ to $C_{10}$) cyclo-alkyl (meth)acrylates, styrene, substituted styrene, acrylonitrile, butadiene, isoprene, isobutylene, ethylene, propylene, and vinyl acetate and other vinyl esters of ($C_1$–$C_{12}$) carboxylic acids, b) 0 or up to 1% by weight of said monomer mixture of at least one polymerizable compound comprising acid groups, which method comprises incorporating into said monomer mixture prior to it's polymerisation:

c) 1 to 3% by weight of said mixture of at least one monomer selected from the group of monomers consisting of amides of α,β-unsaturated $C_3$ to $C_6$ carboxylic acids; and d) at least 1% by weight of said mixture of at least one hydroxy-($C_1$ to $C_8$)alkyl (meth)acrylate, wherein the total quantity of c) and d) constitutes from 2 to 7.5% by weight of said monomer mixture.

* * * * *